April 13, 1926.                                                       1,580,267
E. NELSON
PROCESS FOR MAKING VEHICLE TIRES
Filed July 15, 1922        2 Sheets-Sheet 1

Inventor
Edward Nelson
By his Attorney

April 13, 1926.

E. NELSON 1,580,267

PROCESS FOR MAKING VEHICLE TIRES

Filed July 15, 1922      2 Sheets-Sheet 2

Inventor
Edward Nelson
By his Attorney
Eo. Scherr Jr.

Patented Apr. 13, 1926.

1,580,267

UNITED STATES PATENT OFFICE.

EDWARD NELSON, OF BELLEVILLE, NEW JERSEY, ASSIGNOR TO O. & W. COMPANY, A CORPORATION OF NEW YORK.

PROCESS FOR MAKING VEHICLE TIRES.

Application filed July 15, 1922. Serial No. 575,150.

*To all whom it may concern:*

Be it known that I, EDWARD NELSON, a citizen of the United States, and resident of Belleville, in the county of Essex and State of New Jersey, have invented certain new and useful Processes for Making Vehicle Tires, of which the following is a specification.

Figure 4:
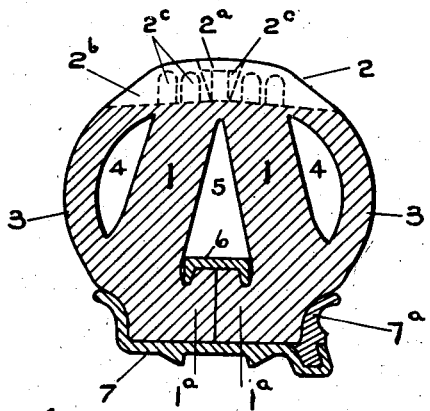

My present invention relates to an improved process and improved means for making vehicle tires including tires containing closed cavities such, for instance, as the tire illustrated in Fig. 4 of the annexed drawings.

The tire of said figure differs from tires of similar construction in the prior art in that the inner and outer walls are integrally joined to each other not only at the tread but also at the base. Difficulty is experienced with said tires of the prior art caused by the attrition between the inner and outer walls at their basal ends where they abut each other due to the constant rubbing action of one basal end against the other when the tire is in action. My present process and apparatus enables me to make this tire with said base ends integrally united and with the spaces 4 maintained so that said difficulty is eliminated, and increased carrying capacity, lateral control, security of mounting and other advantages are obtained.

I also claim as my invention the herein improvements in tires both specifically and generically,—that is to say, my improvements are not limited to the specific form of tire shown in the annexed drawings.

Figure 1:
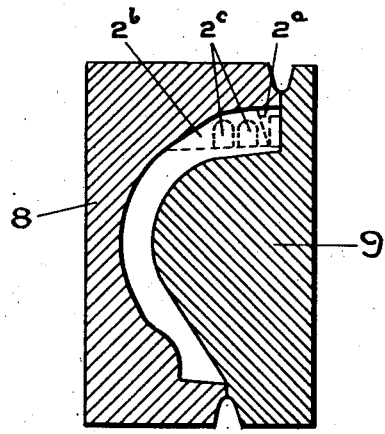
Figure 2:
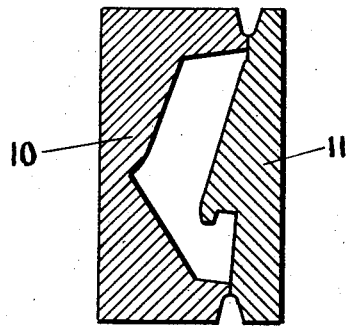
Figure 3:
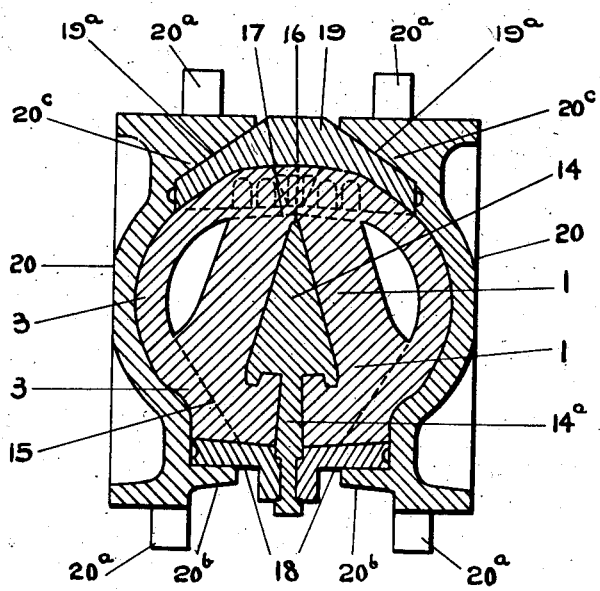

In the drawings, Fig. 1 is a radial cross-section through a pair of mold rings for forming one uncured element of the tire of Fig. 4; Fig. 2 is the same through another pair of mold rings for forming another uncured element of said tire; Fig. 3 is similarly a radial cross-section through my improved vulcanizing mold showing the uncured elements of said tire assembled therein; and Fig. 4 is a radial cross-section through the finished vulcanized tire and through the demountable pneumatic tire-rim on which it is mounted ready for application to a wheel.

It will be understood that my improved process and means are adapted to make tires, including closed cavity tires of other forms than that illustrated, but nevertheless the form of tire shown will serve very well to illustrate the nature and working of my improvements in both respects.

The tire shown in Fig. 4 is a cushion tire made of rubber or rubber compound and comprises inner members or walls 1—1 separated from each other by space 5 and converging towards and united by the tread portion 2. It further comprises elbow-shaped outer members or walls 3—3 containing the inner members between them, with one set of their limbs converging towards and united with said tread portion 2 and with their other set of limbs converging towards the base of the tire, and being there united with the basal ends of the inner members 1—1, thereby providing closed spaces or cavities 4—4 between each outer member and its adjacent inner member.

The basal ends of the inner members have lateral preferably abutting extensions 1ª—1ª closing the base of the space 5, said extensions being adapted to be engaged by means such as the usual endless ring 6 for clamping and securing the tire to the wheel rim.

The illustrated tire is adapted to be received on any demountable tire-rim for pneumatic tires, of which that shown at 7 with its separable flange 7ª is a well known type.

To make this tire by one preferred form of my process, I mold it in separate parts out of uncured rubber or rubber compound, said parts when assembled making up the complete tire.

Thus, by the use of molding rings 8 and 9 shown in radial cross section in Fig. 1 through one part of their circumference, I mold the elbow-shaped outer members or walls 3, together with one-half of the tread portion 2 including any usual cavities 2ª and 2ᵇ in said tread portion, together with the pebble ejectors 2° within said cavities.

Similarly, by the use of molding rings indicated by 10 and 11 in Fig. 2, I mold the inner members 3 out of uncured compound.

The foregoing provides four uncured rubber rings, two of them of the cross section shown in the mold of Fig. 1 and two of the cross section shown in the mold of Fig. 2.

These parts are then assembled in my improved vulcanizing apparatus or mold shown in Fig. 3 to form the tire. Thus, the two inner members 1—1 are assembled on a central core 14 having the cross-sectional shape of the tire cavity 5. This core circumferentially is, of course, a ring made up of the usual separable arcuate sections as shown in Overman United States Patent No. 1,223,726. Also, the cross section of said core ring may be built up of separable adjacent rings to facilitate the subsequent removal of the core, but such details may be varied to suit requirements, are not part of my present invention, and as such are not claimed.

The core ring 14 has a tang 14$^a$ projecting inwardly toward the center of the ring.

The two outer members 3—3 with their attached parts of the tread portion are then laid on the inner members 1—1 as shown in Fig. 3, the lines of separation or joints between said inner and outer members and said parts of the tread being indicated by the dotted lines 15, 16 and 17 in said figure.

The base rings 18—18 of the mold may now be bolted to the sides of the tang 14$^a$ of the central core-ring.

Next, I subject the uncured parts at the joints 15, 16 and 17 to a careful peining or hammering operation with a mallet or to some equivalent operation which will result in coalescing the parts at said joints into an integral or unified mass.

The other illustrated parts of the vulcanizing mold comprise the following: 19 is a tread-ring which, like the core-ring 14, will be made up of separable arcuate parts, whose inner concave face conforms with the tread of the tire and whose outer face comprises the tapered surfaces 19$^a$—19$^a$. Finally, 20—20 are the side-rings of the mold which internally conform with the contour of the outer tire-members 3—3 so that when said side-rings are in place they, together with the base rings 18—18 and the tread-ring 19, etc., completely enclose the tire.

Each side-ring 20 has the usual lugs 20$^a$ by which the two rings may be brought and held together by means of any usual or preferred bolt means or their equivalent, until said rings abut against the side edges of the base and tread rings 18 and 19 respectively. The side-rings 20 also have ledges 20$^b$ adapted to underlie the base-rings 18; and also have tapered surfaced outer portions 20$^c$ engaging the inclined surfaces 19$^a$ of the tread-ring, whereby the bringing together of said side-rings forces the tread-ring inwardly into snug contact with the uncured tire. Similarly, the side and base rings snugly bear against the remaining contour of the tire, there being, however, no deformation of any part beyond merely a general tightening and compression of all the parts, the uncured parts of the tire having been pre-pressed or pre-molded, as above described, of a proper size with due allowance for shrinkage, etc., and for the aforesaid peining or hammering operation.

Before applying the side-rings to the mold as aforesaid, a suitable measured amount of liquid or gas is inserted through hypodermic injection or otherwise into the cavities 4—4, the kind and amount of said fluid being predetermined to cause a suitable pressure to be generated in said cavities when the vulcanizing or curing heat in the usual manner is later applied to the mold (with the side-rings 20 in place) to cause said cavities to maintain their proper form and size as required in the finished tire. Also, a suitable pressure of atmospheric air or other inert gas may be maintained in said cavities during the vulcanizing operation by a suitable connection made with a compression tank or pump.

The mold of Fig. 3, being a vulcanizing mold, has its constituent parts made of metal which is, of course, the usual and well known practice in connection with vulcanizing molds in order that the heat of the vulcanizing oven in which the mold is placed will be conducted to the tire contained in the mold through or by means of the metal walls of the mold and any solid core thereof extending outside of the tire body, such as the core 14 in said Fig. 3. On the other hand, it is advantageous to maintain the shape of isolated tire-cavities such as the outer cavities 4—4 (Fig. 4) during the vulcanization of the tire body by using fluid or gaseous-pressure cores as distinguished from the solid metallic core 14 for making an inner tire-cavity like cavity 5 in Fig. 4.

The advantage of the fluid or gas cores for this purpose is due to the fact that they have such a low capacity for absorbing heat that they interfere to a minimum extent with delivery of the desired quantities of heat units by the ordinary metallic walls and cores of the mold to those adjacent portions of the tire which respectively should receive their vulcanizing heat therefrom. In other words, said fluid or gas cores interfere to a minimum extent with the proper vulcanization of the tire and are especially advantageous in forming or maintaining outer isolated tire-cavities such as 4—4 in Fig. 4 as distinguished from an inner cavity such as 5.

Obviously, any solid, liquid or gaseous substance or combination, thereof which will generate pressure within the closed cavities adapted to maintain their contour without being injurious to the material of the tire, may be used in carrying out my process. Also, in making any given tire, I may build it up as described out of any convenient number of pre-molded, uncured parts, or I may otherwise form the tire to have a closed cavity out of uncured compound, or adapt it to have in effect a closed cavity during the curing operation by providing an extraneous closure. The tire of Fig. 4 may be built up out of three parts by pre-molding both of the outer members 3—3 and the tread portion 2 as one unit, or part; and then applying or wrapping this single part about the other two inner members or parts 1—1 prior to assembling the mold.

Also, I may make changes in the places where the joints occur between the uncured parts as may be advisable to attain the best results.

Also, other changes and modifications may be made in the practical carrying out of my process and in the practical embodiment of my improved vulcanizing mold and in the practical embodiment of my improvements in tires which will nevertheless still be within the spirit of the foregoing disclosure, and within the meaning and spirit of the annexed claims, and which as such are accordingly intended to be covered thereby.

What I claim is:

1. The process of making tires having a closed cavity comprising molding the separate parts of the tire in substantially their finished form out of uncured rubber compound; assembling said uncured parts on an internal mold ring member to form the tire with a cavity, later to be closed, formed between certain of said parts; forcibly unifying said uncured parts at their mutually contacting surfaces to integrate the tire and close said cavity; applying external mold ring members to the uncured tire; and vulcanizing said tire with its form maintained by said internal and said external mold ring members.

2. The process of making tires having a closed cavity comprising molding the tires in separate parts out of uncured rubber compound; assembling the tire with said parts; unifying said parts at their contacting surfaces by a peining operation; internally and externally supporting said parts; and vulcanizing said tire while so supported.

3. The process of making tires having closed and unclosed cavities comprising molding the separate parts of the tire in substantially their finished form out of uncured rubber compound; assembling certain of said uncured parts about an internal mold ring member to form the unclosed cavity, and assembling other uncured parts thereon to complete the tire and to form another cavity therein, later to be closed; forcibly unifying said uncured parts at their mutually contacting surfaces to integrate the tire and close the latter cavity; applying external mold ring members to the uncured tire to co-operate with the internal mold ring member to maintain the form of the tire during vulcanization; and vulcanizing said tire with its form thus maintained by said mold ring members and with its said closed cavity subjected to sufficient internal fluid pressure to maintain its form.

4. The process of making tires of rubber compound or other material vulcanizible by heat with a plurality of annular parallel spaced cavities therein, comprising the molding of the separate parts of the tire to substantially their finished form out of uncured compound, assembling and uniting said parts into a unitary uncured tire structure with spaced closed and unclosed cavities therein, applying fluid pressure generating material to the closed and solid core material to the unclosed cavities; and enclosing said tire structure in a vulcanizing mold and vulcanizing said tire by heat while so enclosed.

5. The process of making tires of rubber compound or other material vulcanizable by heat with a plurality of annular parallel spaced cavities therein, comprising the molding of the separate parts of the tire to substantially their finished form out of uncured compound, assembling and uniting said parts into a unitary uncured tire structure with spaced closed and unclosed cavities therein, the closed being located between the unclosed cavity and the outside of the tire, applying fluid pressure generating material to the closed and solid core material to the unclosed cavities; and enclosing said tire structure in a vulcanizing mold and vulcanizing said tire by heat while so enclosed.

6. The process of vulcanizing tires having inner and outer cavities formed therein, said process comprising maintaining the shape of the inner cavity during vulcanization by using a metallic core therein having a metallic heat conducting connection extending outside of the tire body, and maintaining the shape of an enclosed outer cavity by using fluid pressure therein.

7. The process of vulcanizing tires having an enclosed cavity near the outside of the tire and another more central cavity, said process comprising maintaining the shape of said more central cavity during vulcanization by using a metallic core therein having a metallic heat conducting connection extending outside of the tire body, and maintaining the shape of said enclosed cavity that is near the outside of the tire by using fluid pressure therein.

8. The process of making tires having tread-connected, laterally spaced inner and outer walls with closed and unclosed cavities between them, which comprises forming the tire of uncured tire material with an internal mold member located between and projecting beyond certain of said walls to form the unclosed cavity and with another cavity, later to be closed, located between certain of said walls; forcibly unifying the basal portions of the last named walls to close the cavity between them; applying external mold members to the uncured tire; and vulcanizing said tire with its form maintained by said internal and external mold members.

Signed at New York in the county of New York and State of New York this 14th day of July A. D. 1922.

EDWARD NELSON.